(12) United States Patent
Zanini et al.

(10) Patent No.: US 7,823,717 B2
(45) Date of Patent: Nov. 2, 2010

(54) ROTARY CONVEYOR

(75) Inventors: Gianpietro Zanini, Montanara Di Curtatone (IT); Marco Baroni, Barbasso Di Roncoferraro (IT)

(73) Assignee: Azionaria Costruzioni Macchine Automatiche A.C.M.A. S.p.A. (IT)

( * ) Notice: Subject to any disclaimer, the term of this patent is extended or adjusted under 35 U.S.C. 154(b) by 85 days.

(21) Appl. No.: 12/227,287

(22) PCT Filed: May 17, 2007

(86) PCT No.: PCT/IB2007/001276
§ 371 (c)(1),
(2), (4) Date: Nov. 13, 2008

(87) PCT Pub. No.: WO2007/132341
PCT Pub. Date: Nov. 22, 2007

(65) Prior Publication Data
US 2009/0250314 A1 Oct. 8, 2009

(30) Foreign Application Priority Data
May 17, 2006 (IT) .......................... BO2006A0377

(51) Int. Cl.
*B65G 29/00* (2006.01)
(52) U.S. Cl. ............... 198/479.1; 198/470.1; 198/478.1
(58) Field of Classification Search ............. 198/470.1, 198/478.1, 479.1, 474.1, 480.1, 481.1
See application file for complete search history.

(56) References Cited

U.S. PATENT DOCUMENTS

| | | | |
|---|---|---|---|
| 4,023,513 A * | 5/1977 | Dean ........................ | 198/803.7 |
| 4,124,112 A | 11/1978 | Mohney et al. | |
| 4,428,474 A | 1/1984 | Gau et al. | |
| 5,607,045 A * | 3/1997 | Hermann .................. | 198/476.1 |
| 5,613,593 A | 3/1997 | Gerber | |
| 5,778,633 A * | 7/1998 | Sweeny ...................... | 53/201 |
| 2005/0011730 A1* | 1/2005 | Wittmann et al. ........ | 198/470.1 |

FOREIGN PATENT DOCUMENTS

DE 100 50 084 A1 8/2001
EP 1 277 693 A1 1/2003

* cited by examiner

*Primary Examiner*—James R Bidwell
(74) *Attorney, Agent, or Firm*—Timothy J. Klima; Shuttleworth & Ingersoll, PLC

(57) ABSTRACT

A rotary conveyor (1) utilized in equipment (1*a*) for filling containers (2) with liquid or powder products includes a supporting shaft (8) aligned on a longitudinal axis (X) and coupled to relative drive components (10) associated with the shaft (8), by which the shaft is set in rotation about the axis (X). A support element (11) is keyed to the shaft (8), presenting a peripheral rim (12) with a plurality of slots (13) each designed to accommodate a container (2) transferred from a transport and/or processing device (3) forming part of the equipment (1*a*). The slots (13) incorporate restraining components (14) having grippers (15) movable between a position of engagement, in which the containers (2) are locked to the support element (11), and a position of disengagement in which no restraining force is applied to the containers (2).

18 Claims, 4 Drawing Sheets

ROTARY CONVEYOR

This application is the National Phase of International Application PCT/IB2007/001276 filed May 17, 2007 which designated the U.S. and that International Application was published under PCT Article 21(2) in English.

TECHNICAL FIELD

The present invention relates to a rotary conveyor for transferring containers between two transport or processing stations.

In particular, the present invention finds application in the art field concerned with manufacturing containers, and filling such containers with liquid or powder substances.

BACKGROUND ART

Conventionally, substances of the type mentioned above are packaged using dedicated equipment by which empty containers caused to advance in succession along a processing line are filled and capped automatically. The machine units carrying out the various processing steps, for example filling or capping the single containers, are connected one to the next by transfer devices of linear or angular design.

The prior art embraces transfer devices of angular type, referred to as rotary conveyors, consisting of a rotatable shaft and, keyed to the shaft, a platform and a disc of which the disc is located above the platform and presents an ordered succession of peripheral slots. Each slot is designed to admit a relative container, in part, resting on the platform. The conveyor also presents a fixed external guide, or restraint, combining with the periphery of the top disc to create a feed channel along which the containers are directed.

In operation, the conveyor rotates about the longitudinal axis of the shaft, transferring the containers along a path that describes an arc to a circle, extending from an infeed station located for example on a linear feeder unit, toward an outfeed station located for example on a filing machine.

The fixed restraint serves to keep the containers positioned in the relative slots and thus preclude any possibility of their being flung from the selfsame slots when propelled forward at the high angular velocities typical of such conveyors.

In general, the peripheral slots of the top disc will be shaped to match the contours of the containers they are to accommodate; thus, when the time comes to switch production to a different size or shape of container, the disc must be removed and replaced with a different disc having suitably proportioned slots.

The procedure of replacing the disc is not without complications, however, as the entire system must be shut down so that the part in question can be removed, manually, and a change part fitted.

In addition, it will be appreciated that in order to handle different sizes of containers, a considerable number of discs will be needed, each designed to accommodate a given container. Consequently, the cost of making the rotary conveyor, in its entirety, is rendered excessive by having to deploy multiple change discs.

A further drawback derives from the manner of conveying the containers, which are caused to slide against the restraint while advancing along the circular path, with the result that their outer surface can suffer damage. Moreover, as the containers are transferred from the infeed station to the conveyor, or from the conveyor to the outfeed station, the bottom of the single container is caused to slide on the platform and on a pedestal forming part of each station.

In other words, with the bottom of the container forced to slide in some measure during the transfer movement, this surface can also suffer damage.

The object of the present invention, accordingly, is to provide a rotary conveyor unaffected by the drawbacks described above.

One object of the invention, in particular, is to provide a rotary conveyor by which containers are handled without being subjected to frictional contact.

A further object of the invention is to provide a rotary conveyor that will be inexpensive to make and can be utilized in conjunction with any type of container.

DISCLOSURE OF THE INVENTION

The stated objects are realized, according to the invention, in a rotary conveyor of which the characterizing features are as recited in one or more of the appended claims.

The invention will now be described in detail, by way of example, with the aid of the accompanying drawings, in which.

With reference to the accompanying drawings, numeral 1 denotes a rotary conveyor, in its entirety.

The conveyor 1 is utilized advantageously in equipment 1a for packaging liquid or powder products in containers 2. Equipment 1a of the type in question can be set up, for example, to fill such containers 2 with selected products and thereupon close each filled container with a respective screw cap.

Figure 1:
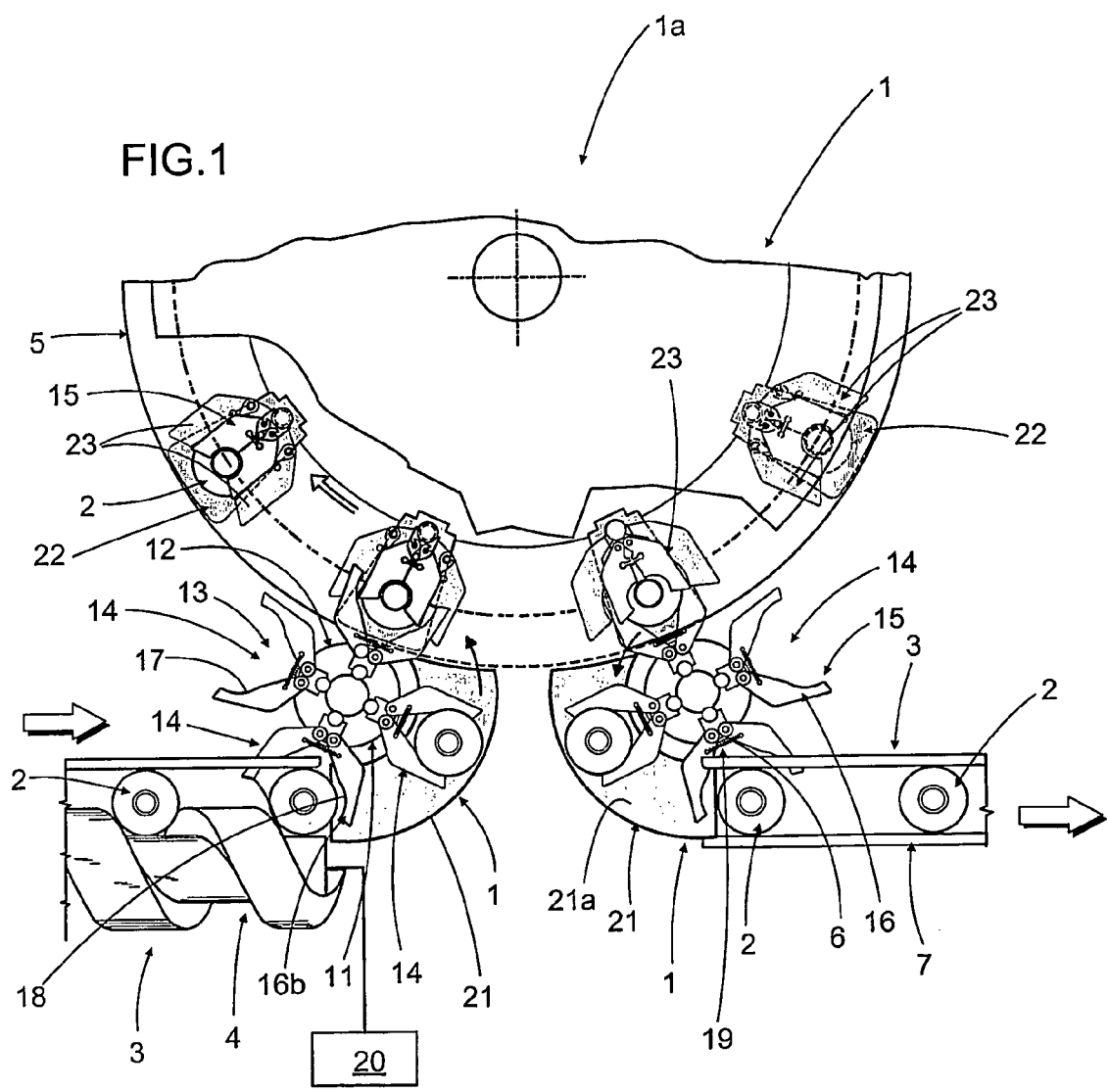
FIG. 1 shows a portion of equipment for processing containers filled with liquid or powder products, viewed in plan from above, furnished with a pair of rotary conveyors according to the present invention.

FIG. 1 shows a portion of equipment 1a for filling and capping containers 2, illustrated purely by way of example and therefore implying no limitation, furnished with a pair of conveyors 1 embodied according to the present invention.

In reality, the rotary conveyor 1 could be incorporated into any item of equipment where containers 2 need to be transferred between two processing stations.

As illustrated schematically and by way of example in FIG. 1, the equipment 1a is associated with at least two devices 3 by which the containers 2 are transported and/or processed. More exactly, the devices 3 illustrated in FIG. 1 are identifiable as: an auger device 4 occupying an infeed station, by which the containers 2 are caused to advance in ordered single file; a filling device 5 by which a liquid or powder product is dispensed into the containers 2; and a feed device 7 consisting in a conveyor belt, occupying an outfeed station by way of which filled and capped containers 2 are carried away from the equipment 1a.

The three devices 4, 5 and 7 mentioned are neither described nor illustrated in detail here, being conventional in embodiment and purely incidental to the present invention.

More pertinently, the devices 4, 5 and 7 are interconnected by respective rotary conveyors 1 serving to transfer containers 2 from one device to the next.

Figure 3:
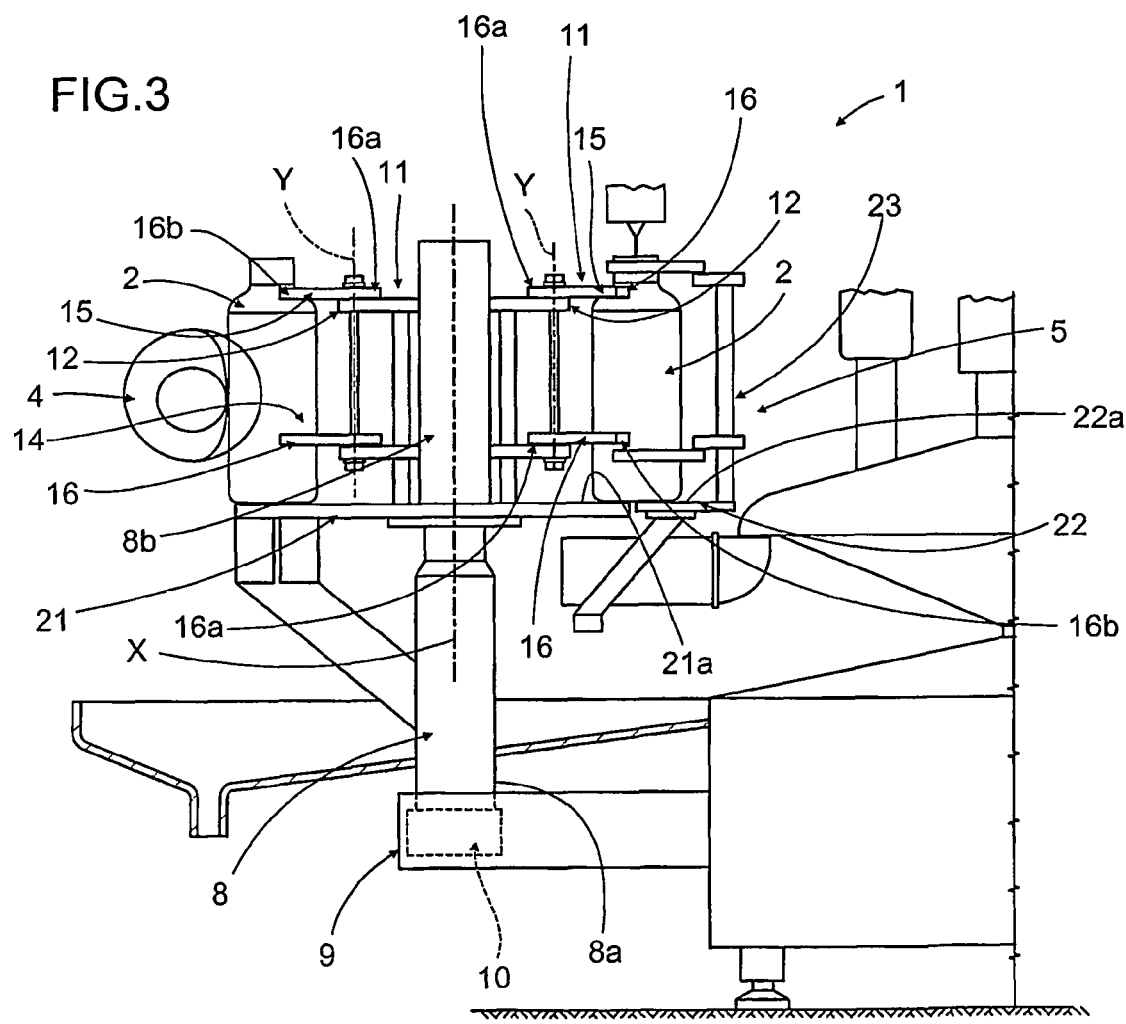
FIG. 3 shows the rotary conveyor of FIG. 1, viewed in a side elevation and partly in section

In particular, and as illustrated in FIG. 3, the conveyor 1 comprises a supporting shaft 8, aligned on a longitudinal axis "X", presenting a bottom end denoted 8a associated with a respective floor-standing base frame 9, and a top end denoted 8b.

The frame 9 houses motion-inducing means 10 coupled to the shaft 8 at the bottom end 8a, by which the selfsame shaft 8 is set in rotation about the aforementioned longitudinal axis "X". Such motion-inducing means 10 (indicated by phantom lines in FIG. 3) are embodied preferably as a motor, or other suitable drive transmission components associated with a motor by which the various devices 3 installed in the equipment 1a are set in motion.

The conveyor 1 further comprises a support element 11 keyed onto the top end 8b of the shaft 8 and rotatable thus with the shaft as one about the aforementioned axis "X".

The support element 11 is fashioned with a peripheral rim 12 presenting a plurality of slots 13, each designed to accommodate a respective container 2.

More exactly, the peripheral geometry of the support element 11 substantially resembles that of a star wheel type conveyor, in this instance with slots 13 afforded by respective projecting arms.

Each slot 13 presents restraining means 14 capable of movement between a position of engagement, in which the container 2 is locked to the support element 11, and a position of disengagement in which no restraining force is applied to the container 2.

The aforementioned restraining means 14 present a plurality of grippers 15, occupying a respective slot 13 and comprising at least one pair of jaws 16 attached to the peripheral rim 12 of the support element 11.

The jaws 16 of each pair are installed facing one another and can be drawn together, in the position of engagement, or spread apart in the position of disengagement.

In a preferred embodiment, the jaws 16 of each gripper 15 are substantially of "C" shape, with respective concave surfaces 17 facing one another and presenting a profile substantially matched to that of the container 2. Each jaw 16 comprises a first end 16a associated with the peripheral rim 12 and a second end 16b, opposite to the first end 16a, presenting a contact surface 18 offered to the container 2 in the aforementioned position of engagement. Similarly, the contact surfaces 18 afforded by the jaws 16 of each gripper 15 are disposed facing one another, and thus can be drawn together and spread apart when motion is induced in the jaws 16.

To advantage, as shown in FIG. 3, each gripper 15 presents two pairs of jaws 16, positioned one above the other. Moreover, each jaw 16 of one pair is coupled to and set in motion simultaneously with the corresponding jaw 16 of the other pair.

In accordance with a preferred embodiment of the invention illustrated in the accompanying drawings, the first end 16a of each jaw 16 is hinged to the rim 12 of the support element 11 and pivotable about an axis "Y" parallel to the longitudinal axis "X" of the shaft 8. In addition, the gripper 15 presents at least one flexible element 19 associated with the respective jaws 16 and serving to maintain the selfsame jaws in contact with the container 2 in the position of engagement.

In particular, the flexible element 19 consists advantageously in a coil spring 6 or other piece of elastically deformable material interposed between the jaws 16 of a respective gripper 15 and associated by way of respective opposite ends with the two jaws 16.

Accordingly, when a container 2 is forced between the respective jaws 16, the jaws are made to spread apart and in so doing place the flexible element 19 under tension, with the result that the jaws 16 are pulled toward one another and the container 2 is gripped between them.

Alternatively, the grippers 15 might be coupled to motion-inducing means 20 of electric or mechanical type, by which the jaws 16 can be closed and spread to grip and release the containers as the support element 11 rotates about the relative axis "X".

Figure 2:
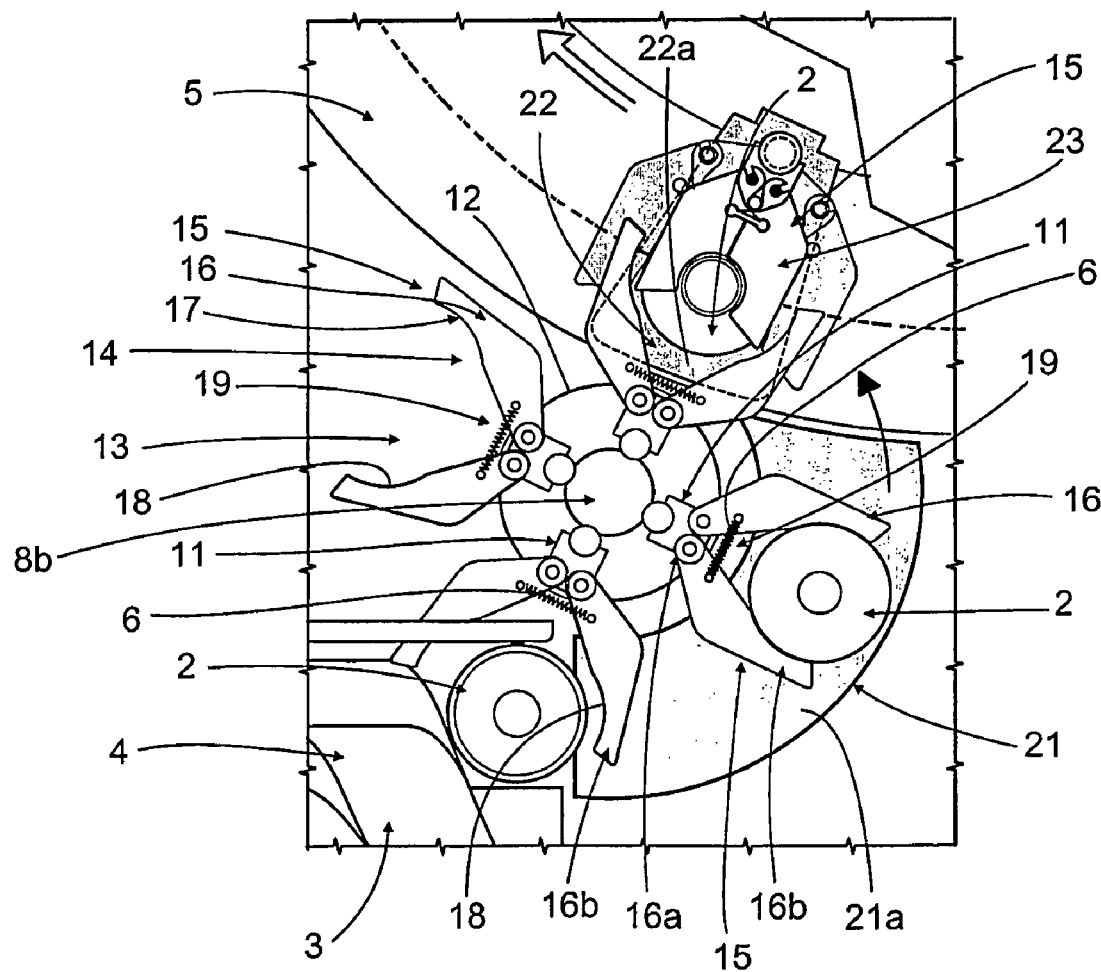
FIG. 2 is an enlarged detail of FIG. 1, viewed in plan from above.

With reference in particular to FIGS. 2 and 3, it will be seen that the conveyor 1 can also be equipped with a fixed platform 21, concentric with the shaft 8 and positioned beneath the support element 11. The platform appears substantially flat, occupying a horizontal plane, and presents a top bearing surface 21a on which the containers 2 rest when held by the grippers 15.

More exactly, the containers 2 are positioned on the platform 21 in such a way as to slide over the top surface 21a as they advance on the conveyor.

The platform 21 is also located adjacent to pedestals 22 forming part of the aforementioned devices 3 and occupying the same horizontal plane as the platform 21.

As illustrated in FIG. 3, for example, where the conveyor 1 is located between the auger device 4 and the filling device 5, the platform 21 is positioned adjoining respective pedestals 22 of these same devices, so as to receive containers 2 from the auger device 4 and transfer them to the filling device 5. Each pedestal 22 presents a peripheral rim 22a adjoining the platform 21 at a respective transfer zone.

The filling device 5 also incorporates gripping mechanisms 23 similar to the restraining means 14 of the rotary conveyor 1, by which respective containers 2 are taken up and held.

Advantageously, the gripping mechanisms 23 interact with the restraining means 14, taking up and releasing each successive container 2 transferred between the conveyor 1 and the device 5.

In particular, the gripping mechanisms 23 are interposed between the pairs of jaws 16 presented by each gripper 15, and calibrated on the basis of how far the containers 2 must be carried. In other words, referring to the example of FIGS. 2 and 3, where the containers 2 must be released by a first rotary conveyor 1 to the filling device 5, the gripping mechanisms 23 of this same device 5 will be equipped with flexible elements calibrated so as to defeat the restraining force of the jaws 16 and ease the containers 2 from between the relative contact surfaces 18.

Alternatively, the gripping mechanisms 23 and the restraining means 14 might be operated mechanically, for example by cam means of conventional type, not described in detail, which will be timed appropriately for the purpose of transferring the containers between the rotary conveyors 1 and the transport or processing devices 3.

Thus, with the support element 11 set in rotation, the containers 2 held by the restraining means 14 are conveyed along a set path describing an arc to a circle.

The containers 2 advance, sliding across the platform 21 and ultimately onto the pedestal 22 of the filling device 5. At the point of transfer, a gripping mechanism 23 of the filling device 5 closes on each container 2 in turn and removes it from the corresponding gripper 15. Accordingly, the jaws 16 of the gripper 15 will be spread slightly so as to release the container 2.

The operation of the conveyor 1 described above remains the same, whatever its application in the equipment 1a In effect, the conveyor 1 interposed between the filling device 5 and the outfeed device 7 is furnished likewise with grippers 15 positioned to take up the containers 2 advancing in succession on the filler device 5. In this instance, the containers 2 are forced between the jaws 16 of the grippers, which respond by easing the containers 2 from the gripping mechanisms 23 and will therefore spread to receive and restrain the selfsame containers.

To advantage, a container 2 occupying the rotary conveyor 1 is not made to slide against any fixed lateral restraint while advancing along the circular path. Rather, the containers 2 resting on the platform 21 are held securely by the restraining means 14.

Consequently, the side walls of containers 2 are protected from the kind of damage that might be caused by rubbing against a fixed restraint.

In addition, the conveyor 1 can be used to handle any type of container 2 without the need to fit change parts. By equipping the conveyor with jaws 16 able to draw together and spread apart, in effect, any given container 2 can be handled, irrespective of size.

Accordingly, the conveyor can operate continuously, unaffected by stoppages for the purpose of fitting change parts.

Moreover, the conveyor 1 is simple and inexpensive, given that there are no accessory parts needed for the purpose of adapting the conveyor to handle different containers.

Figure 4:
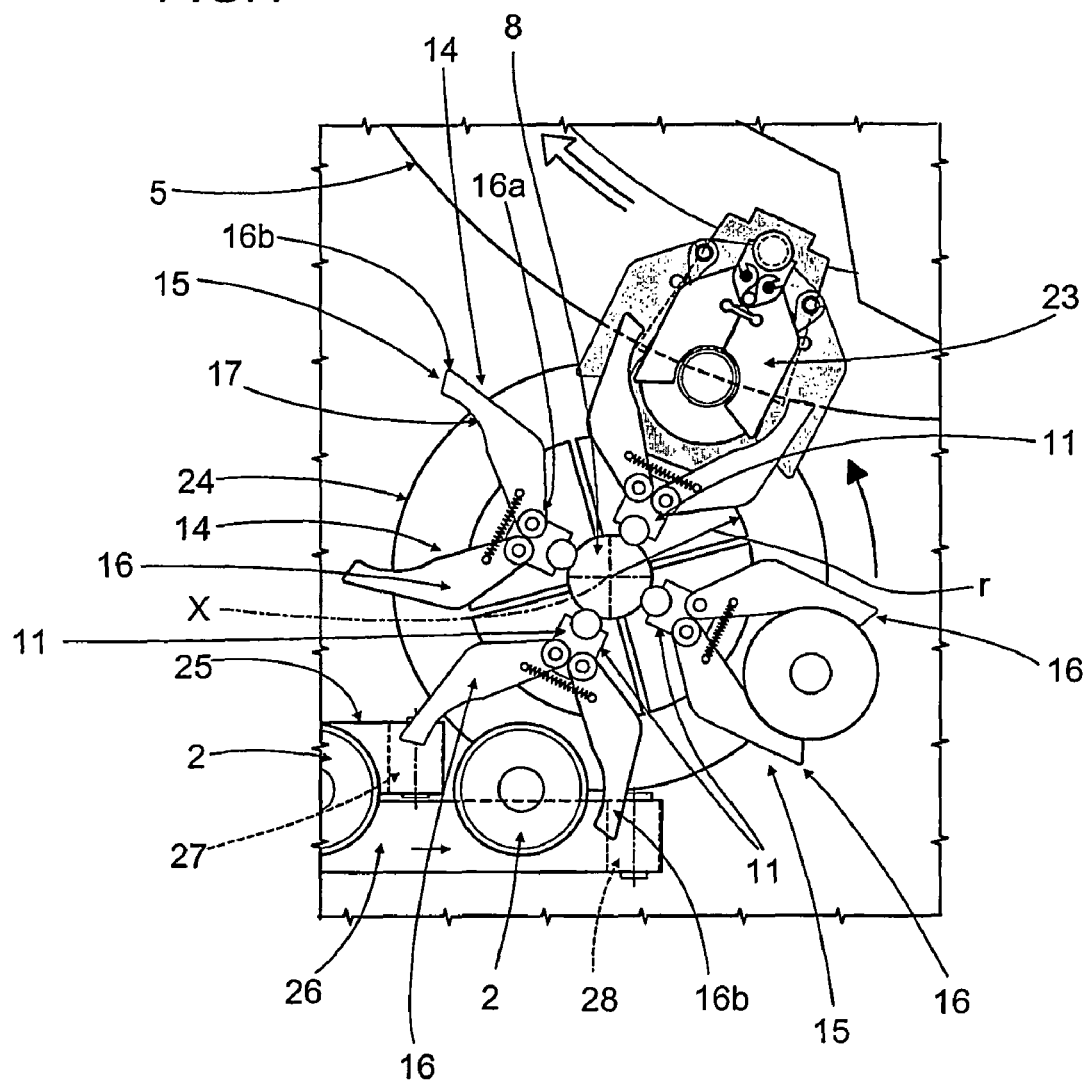
FIG. 4 shows the same enlarged detail as in FIG. 2, illustrated in an alternative embodiment.

FIG. 4 illustrates an alternative embodiment of the conveyor 1, presenting the same support element 11, and the same jaws 16 providing means 14 by which to restrain the containers 2, but without the fixed platform 21. Instead, the conveyor 1 comprises a disc 24, rigidly associated with the shaft 8 and set in rotation as one with the selfsame shaft about the relative axis "X", turning anticlockwise as viewed in FIG. 4. The radial dimensions "r" of the disc 24 are such that the containers 2 remain supported from beneath when transferred by the conveyor 1 to the filling device 5, and from this same device to the feed device 7 operating at the outfeed station, each positioned with the respective bottom face standing substantially half-on and half-off the disc 24. Employing this solution, the conveyor affords the same advantages as those of the solution described above, with the additional benefit that the inevitable albeit minimal sliding contact induced between the bottom of the container 2 and a fixed platform 21 can be eliminated entirely.

It will be seen in the solution of FIG. 4 that the auger device 4, or the end part of this same device, is replaced by two conveyor belts denoted 25 and 26, looped around respective pulleys 27 and 28 of which two only are visible in FIG. 4. To optimize the release of the containers 2 to the rotary conveyor 1, the two conveyor belts are of dissimilar length, and more exactly, the pulley 27 of the shorter belt 25 is placed obliquely tangential to the disc 24, whilst the pulley 28 of the longer belt 26 is aligned tangentially on the diameter of the disc 24 lying perpendicular to the selfsame belt 26.

The invention claimed is:

1. A rotary conveyor, comprising:
   a supporting shaft aligned on a longitudinal axis;
   a motion-inducing mechanism associated with the shaft, by which the shaft is set in rotation about the axis;
   a support element keyed to the shaft, of which a peripheral rim includes a plurality of slots each for accommodating an advancing container,
   a restraining mechanism for each slot movable between a position of engagement in which the container is locked to the support element, and a position of disengagement in which no restraining force is applied to the container,
   a disc on which to stand the container, associated rigidly with the shaft and rotatable thus about the longitudinal axis.

2. A conveyor as in claim 1, wherein each restraining mechanism comprises a plurality of grippers, each positioned to coincide with a respective slot and accommodating a relative container.

3. A conveyor as in claim 2, wherein each gripper comprises at least one pair of jaws attached to the peripheral rim of the support element, having respective mutually opposed contact surfaces and movable toward one another in the position of engagement so as to bring the contact surfaces against a respective container, and away from one another in the position of disengagement so as to distance the contact surfaces from the container.

4. A conveyor as in claim 3, wherein each jaw includes a first end hinged to the peripheral rim of the support element and pivotable about a respective axis parallel to the longitudinal axis of the shaft and a second end opposite to the first end and having the contact surface, each gripper having at least one flexible element associated with the first ends of the respective jaws for maintaining the jaws in contact with the container when occupying the position of engagement.

5. A conveyor as in claim 4, and further comprising a motion-inducing mechanism by which the jaws are drawn together and spread apart.

6. A conveyor as in claim 5, comprising a fixed platform aligned concentrically with the shaft, positioned below the support element and having a top bearing surface on which to stand each container.

7. A conveyor as in claim 1, wherein each container is supported by the disc, each standing with substantially half a respective bottom face positioned directly on the disc.

8. A conveyor as in claim 5, wherein each container is supported by the disc, each standing with substantially half a respective bottom face positioned directly on the disc.

9. Equipment for processing containers, comprising:
   at least two devices for at least one of transporting and processing containers,
   at least one rotary conveyor, positioned between the at least two devices, wherein the rotary conveyor comprises:
      a supporting shaft, aligned on a longitudinal axis;
      a motion-inducing mechanism associated with the shaft, by which the shaft is set in rotation about the axis;
      a support element keyed to the shaft, of which a peripheral rim includes affords a plurality of slots each for accommodating an advancing container,
      a restraining mechanism for each slot movable between a position of engagement in which the container is locked to the support element, and a position of disengagement in which no restraining force is applied to the container,
      a disc on which to stand the container, associated rigidly with the shaft and rotatable thus about the longitudinal axis.

10. Equipment as in claim 9, wherein each restraining mechanism comprises a plurality of grippers, each positioned to coincide with a respective slot and accommodating a relative container.

11. Equipment as in claim 10, wherein each gripper comprises at least one pair of jaws attached to the peripheral rim of the support element, having respective mutually opposed contact surfaces and movable toward one another in the position of engagement so as to bring the contact surfaces against a respective container, and away from one another in the position of disengagement so as to distance the contact surfaces from the container.

12. Equipment as in claim 11, wherein each jaw includes a first end hinged to the peripheral rim of the support element and pivotable about a respective axis parallel to the longitudinal axis of the shaft, and a second end opposite to the first end and having the contact surface, each gripper having at least one flexible element associated with the first ends of the respective jaws for maintaining the selfsame jaws in contact with the container when occupying the position of engagement.

13. Equipment as in claim 12, and further comprising a motion-inducing mechanism by which the jaws are drawn together and spread apart.

14. Equipment as in claim 13, comprising a fixed platform aligned concentrically with the shaft, positioned below the support element and having a top bearing surface on which to stand the containers.

15. Equipment as in claim 14, wherein the containers are supported by the disc, each standing with substantially half a respective bottom face positioned directly on the disc.

16. Equipment as in claim 15, wherein the devices comprise respective pedestals occupying a common plane coinciding with a plane occupied by the platform, each having a peripheral rim positioned adjacent to the platform at a respective transfer zone.

17. Equipment as in claim 16, wherein at least one of the devices comprises a plurality of gripping mechanisms taking up and releasing the containers and operating in conjunction with the restraining mechanisms of the rotary conveyor.

18. Equipment as in claim 9, wherein the containers are supported by the disc, each standing with substantially half a respective bottom face positioned directly on the disc.

* * * * *